US011068230B2

United States Patent
Gui et al.

(10) Patent No.: US 11,068,230 B2
(45) Date of Patent: Jul. 20, 2021

(54) BLUETOOTH SPEAKER, AND INTELLIGENT CONTROL METHOD FOR PLAYING AUDIO

(71) Applicant: GOERTEK INC., WeiFang (CN)

(72) Inventors: Xiaole Gui, WeiFang (CN); Xiaoguang Niu, WeiFang (CN)

(73) Assignee: GOERTEK INC., Weifang (CN)

(*) Notice: Subject to any disclaimer, the term of this patent is extended or adjusted under 35 U.S.C. 154(b) by 0 days.

(21) Appl. No.: 16/648,075

(22) PCT Filed: Dec. 18, 2017

(86) PCT No.: PCT/CN2017/116950
§ 371 (c)(1),
(2) Date: Jul. 24, 2020

(87) PCT Pub. No.: WO2019/052068
PCT Pub. Date: Mar. 21, 2019

(65) Prior Publication Data
US 2020/0356336 A1 Nov. 12, 2020

(30) Foreign Application Priority Data

Sep. 18, 2017 (CN) .......................... 201710843234.6

(51) Int. Cl.
*G06F 3/16* (2006.01)
*G06F 3/01* (2006.01)
*H04R 1/04* (2006.01)

(52) U.S. Cl.
CPC .............. *G06F 3/165* (2013.01); *G06F 3/011* (2013.01); *G06F 2203/011* (2013.01); *H04R 1/04* (2013.01)

(58) Field of Classification Search
CPC .. H04R 3/00; H04R 1/04; G06F 3/165; G06F 3/011; G06F 2203/011
(Continued)

(56) References Cited

U.S. PATENT DOCUMENTS

2015/0187199 A1* 7/2015 Chang .................... A61B 5/048
340/575
2016/0089028 A1* 3/2016 Chatterjee .............. G11B 27/34
340/870.07
(Continued)

FOREIGN PATENT DOCUMENTS

CN 104540071 A 4/2015
CN 104699248 A 6/2015
(Continued)

OTHER PUBLICATIONS

International Search Report and Written Opinion along with English Translation of International Search Report for International Application No. PCT/CN2017/116950 dated Jun. 7, 2018, pp. 8.

*Primary Examiner* — Melur Ramakrishnaiah
(74) *Attorney, Agent, or Firm* — Bochner IP, PLLC; Andrew D. Bochner

(57) ABSTRACT

The invention provides a Bluetooth speaker and an intelligent control method for playing audio, the Bluetooth speaker comprises a housing, a Bluetooth module inside the housing, an audio playing module, an audio control module connected to the audio playing module and a central processor inside the housing, the Bluetooth module and the audio control module are connected to the processor, the speaker is connected to an intelligent wearable device through the Bluetooth module, so that the speaker performs Bluetooth communication with the device, the processor acquires heart rate data transmitted by the device through the Bluetooth module, sends a preset control instruction to the audio control module according to the data, the audio control module controls rhythm, volume, pausing and powering-off when the audio playing module plays audio according to the
(Continued)

instruction. The invention intelligently controls audio playing automatically thereby upgrading user's usage experience.

9 Claims, 1 Drawing Sheet

(58) Field of Classification Search
USPC .................................. 700/94; 381/333, 334
See application file for complete search history.

(56) References Cited

U.S. PATENT DOCUMENTS

2017/0208364 A1\* 7/2017 Glazier .............. H04N 21/4432
2017/0251295 A1\* 8/2017 Pergament ............. A61B 5/165

FOREIGN PATENT DOCUMENTS

| CN | 105430568 A | | 3/2016 |
| CN | 106535044 A | \* | 3/2017 |
| CN | 106535044 A | | 3/2017 |

\* cited by examiner

US 11,068,230 B2

BLUETOOTH SPEAKER, AND INTELLIGENT CONTROL METHOD FOR PLAYING AUDIO

TECHNICAL FIELD

The present invention relates to a technical field of speaker, and more particularly, to a Bluetooth speaker and an intelligent control method for playing audio.

BACKGROUND

As an audio playing device, the speaker is widely used in various places such as homes and theaters. In recent years, with the development of Bluetooth technology, Bluetooth speakers have also developed rapidly, and functions thereof are also increasing. Bluetooth speaker is a device that applies Bluetooth technology to speakers and electronic devices, the speaker and the electronic device are connected via Bluetooth, thereby avoiding the entanglement of wires and enabling users to listen to music in a limited range. With the development of smart terminals, Bluetooth speaker are getting more and more attention from users.

Many people have a habit of listening to music before going to bed, and listening to music may relief stress and help them sleep. The current Bluetooth speakers usually only have timed play/off function. However, users want the music to be played before falling asleep, and the music to be turned off after falling asleep. Obviously, the current Bluetooth speakers cannot achieve the above functions, as a result, the music stops before the user falls asleep, so that the hypnotic function cannot be achieved; or the music continues to play after the user fell asleep, which affects the sleep quality of the user and causes unnecessary waste of resources.

SUMMARY

In view of the above problem, an object of the present invention is to provide a Bluetooth speaker and an intelligent control method for playing audio, so as to solve the problem that the existing Bluetooth speakers cannot play audio intelligently.

The Bluetooth speaker of the present invention comprises a housing, a Bluetooth module, an audio control module, and an audio playing module provided inside the housing, wherein the audio control module is connected with the audio playing module; wherein, the Bluetooth speaker further comprises a central processor, the central processor is provided inside the housing, and both of the Bluetooth module and the audio control module are connected to the central processor; wherein the Bluetooth speaker is connected with an intelligent wearable device through the Bluetooth module so that the Bluetooth speaker carries out Bluetooth communication with the intelligent wearable device, and the central processor acquires, through the Bluetooth module, heart rate data transmitted by the intelligent wearable device, and sends a preset control instruction to the audio control module according to the heart rate data, and the audio control module controls, according to the control instruction, the rhythm and the volume, as well as pausing and powering off of the audio played by the audio playing module.

In addition, a preferred configuration is that the audio control module comprises a volume adjustment module; wherein the central processor is provided with a plurality of volume down preset intervals therein, in which heart rate ranges are sequentially reduced, and when the heart rate data is within a corresponding volume down preset interval, the central processor sends a volume down control instruction to the volume adjustment module, and the volume adjustment module controls, according to the volume down control instruction, the volume of the audio played by the audio playing module to reduce by a corresponding preset decibel value.

In addition, a preferred configuration is that the audio control module comprises a play/pause module, and a third preset interval with a heart rate range lower than that of any of the volume down preset interval is further provided in the central processor, when the heart rate data is within the third preset interval, the central processor sends a pause control instruction to the play/pause module, and the play/pause module controls the audio playing module to pause the playing of the audio according to the pause control instruction.

In addition, a preferred configuration is that the Bluetooth speaker further comprises a power source module, and the audio control module comprises a power on/off module, the power source module is provided inside the housing and is connected with the power on/off module; wherein, a fourth preset interval with a heart rate range lower than that of the third preset interval is further provided in the central processor, and when the heart rate data is within the fourth preset interval, the central processor sends a power off control instruction to the power on/off module, and the power on/off module disconnects from the power source module according to the power off control instruction.

In addition, a preferred configuration is that when the heart rate data is changed from the third preset interval to a volume down preset interval with a lowest heart rate range, the central processor sends a play control instruction to the play/pause module, and the play/pause module controls the audio playing module to play audio according to the play control instruction, and volume of the audio played by the audio playing module is consistent with volume of the audio played by the audio playing module after reducing by a corresponding preset decibel value in the volume down preset interval with the lowest heart rate range.

In addition, a preferred configuration is that when the heart rate data is changed from a volume down preset interval with a lower heart rate range to a volume down preset interval with a higher heart rate range, the central processor sends a volume up control instruction to the volume adjustment module, the volume adjustment module controls the volume of the audio played by the audio playing module to increase according to the volume up control instruction, and volume of the audio played by the audio playing module is consistent with volume of the audio played by the audio playing module after reducing by a corresponding preset decibel value in the volume down preset interval with the higher heart rate range.

In addition, a preferred configuration is that the audio control module comprises an audio selection module, and a fifth preset interval with a heart rate range higher than that of any of the volume down preset interval is further provided in the central processor, wherein, when the heart rate data is within the fifth preset interval, the central processor sends an audio selection instruction to the audio selection module, and the audio selection module selects an audio with a cheerful audio rhythm for the audio playing module to play according to the audio selection instruction; when the heart rate data is equal to or lower than a minimum value of the fifth preset interval, the central processor sends an audio selection instruction to the audio selection module, and the audio selection module selects an audio with a slow rhythm for the audio playing module to play according to the audio selection instruction.

In addition, a preferred configuration is that the Bluetooth speaker further comprises a display screen disposed on the housing and connected to the central processor, and the display screen is used to display status information of the Bluetooth speaker.

In addition, a preferred configuration is that the housing is provided with a mechanical control button and/or touch control button thereon, and the mechanical control button and/or touch control button comprises a volume up/down button, a play/pause button, and a power on/off button.

In addition, the present invention provides an intelligent control method for playing audio in Bluetooth speaker, the Bluetooth speaker is the above-described Bluetooth speaker, the control method comprises the following steps: the Bluetooth speaker is connected with an intelligent wearable device through the Bluetooth module; the central processor receives the heart rate data transmitted by the intelligent wearable device; the central processor sends a preset control instruction to the audio control module according to the received heart rate data, and the audio control module controls, according to the control instruction, the rhythm and the volume, as well as pausing and powering off of the audio played by the audio playing module.

According to the above, the Bluetooth speaker provided by the present invention provides a central processor inside the housing of the Bluetooth speaker, connects the Bluetooth module and the audio control module of the Bluetooth speaker to the central processor, receives heart rate data transmitted by the intelligent wearable device via the central processor, and sends a preset control instruction to the audio control module according to the heart rate data, so that the audio control module controls, according to the preset control instruction, the rhythm of the audio played by the audio playing module which is connected to the audio control module. The present invention can intelligently control audio playing automatically, thereby improving the usage experience of a user.

In order to achieve the above and related objects, one or more aspects of the present invention include features to be described in detail and specifically pointed out in the following. The following description and drawings describe certain exemplary aspects of the present invention in detail. However, these aspects indicate only some of the various ways in which the principles of the present invention may be used. Furthermore, the present invention is intended to include all of these aspects and their equivalents.

BRIEF DESCRIPTION OF THE DRAWINGS

Other objects and results of the present invention will become more apparent and easier to understand through the following description with reference to the accompanying drawings and with a more comprehensive understanding of the present invention.

The same reference numbers indicate similar or corresponding features or functions throughout the drawings.

Figure 1:
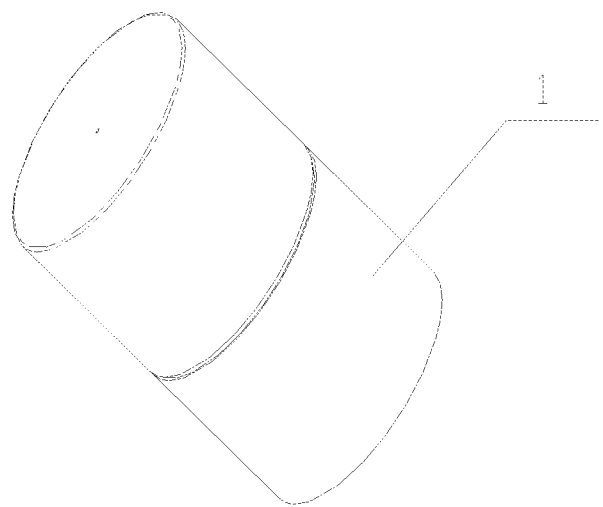
FIG. 1 is a structural schematic diagram of a Bluetooth speaker according to an embodiment of the present invention.

In the drawings: housing 1; Bluetooth module 2, audio control module 3, volume adjustment module 31, play/pause module 32, power on/off module 33, audio selection module 34, audio playing module 4, central processor 5, power source module 6, provided inside the housing.

DETAILED DESCRIPTION OF EMBODIMENTS

Hereinafter, specific embodiments of the present invention will be described with reference to the accompanying drawings in detail.

In view of the above-described problem that the existing Bluetooth speakers cannot realize intelligent audio playing which results in poor user experience, the present invention provides a central processor inside a housing of a Bluetooth speaker, connects a Bluetooth module and an audio control module of the Bluetooth speaker to the central processor, receives heart rate data transmitted by an intelligent wearable device, and sends a preset control instruction to the audio control module according to the heart rate data, so that the audio control module controls, according to the preset control instruction, the rhythm of the audio played by the audio playing module which is connected to the audio control module. The present invention can intelligently control audio playing automatically, thereby improving the usage experience of a user.

Figure 2:
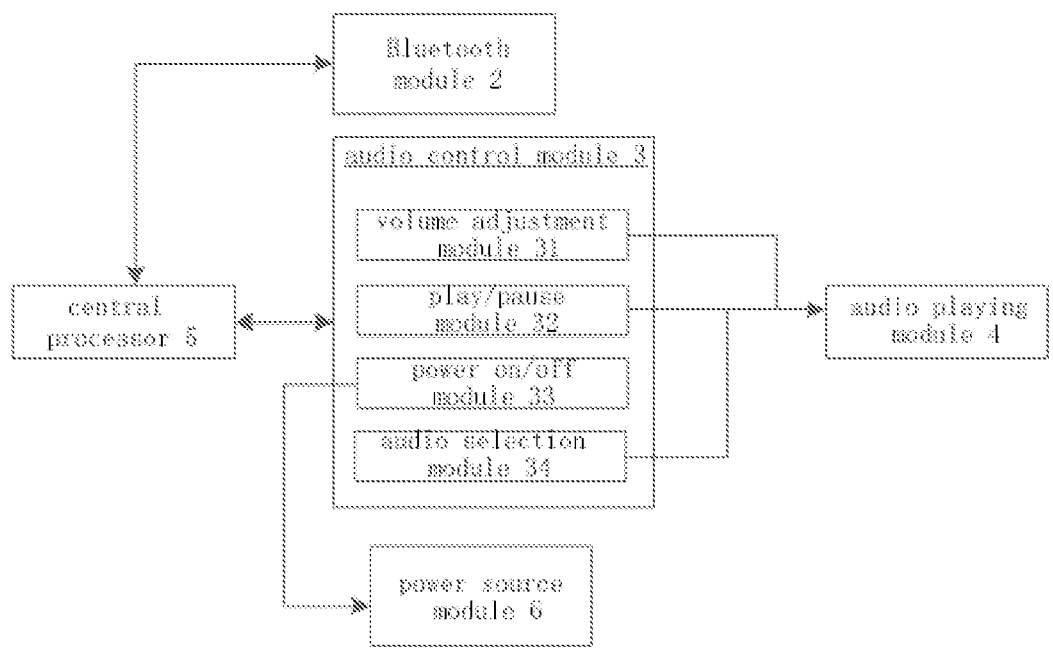
FIG. 2 is a logical structure block diagram of a Bluetooth speaker according to an embodiment of the present invention.

In order to explain the Bluetooth speaker provided by the present invention, FIG. 1 shows a structure of the Bluetooth speaker according to an embodiment of the present invention, FIG. 2 shows a logical structure of the Bluetooth speaker according to the embodiment of the present invention.

As shown in FIG. 1 and FIG. 2, the Bluetooth speaker provided by the present invention comprises a housing 1, a Bluetooth module 2, an audio control module 3, an audio playing module 4, and a central processor 5 provided inside the housing 1, the audio control module 3 is connected with the audio playing module 4, both of the Bluetooth module 2 and the audio control module 3 are connected to the central processor 5; wherein, the Bluetooth speaker is connected to an intelligent wearable device through the Bluetooth module 2 so that the Bluetooth speaker carried out Bluetooth communication with the intelligent wearable device, and the central processor 5 obtains, through the Bluetooth module 2, heart rate data transmitted by the intelligent wearable device, and sends a preset control instruction to the audio control module 3 according to the heart rate data, and the audio control module controls, according to the preset control instruction, the rhythm of the audio played by the audio playing module 4.

Since normal persons have relatively stable heart rate after falling asleep, in order to solve the problem that the music continues to play after the user falls asleep or the music stops before the user falls asleep, the present invention utilizes the heart rate data to control the rhythm of audio played by the audio playing module of the Bluetooth speaker, so as to achieve the purpose of intelligent playing of Bluetooth speaker.

In more detail, the audio control module 3 of the Bluetooth speaker provided by the present invention comprises a volume adjustment module 31, a play/pause module 32, and a power on/off module 33. The central processor 5 is provided with three preset intervals therein, that is, a first preset interval, a second preset interval, and a third preset interval, in which heart rate ranges reduce in sequence. Wherein, when the heart rate data is within the first preset interval, the central processor 5 sends a volume down first control instruction to the volume adjustment module 31, and the volume adjustment module 31 controls, according to the volume down first control instruction, the volume of audio played by the audio playing module 4 to reduce by a first preset decibel; when the heart rate data is within the second preset interval, the central processor 5 sends a volume down second control instruction to the volume adjustment module 31, and the volume adjustment module 31 controls, according to the volume down second control instruction, the volume of the audio played by the audio playing module 4 to reduce by a second preset decibel; when the heart rate data is within the third preset interval, the central processor 5 sends a pause control instruction to the play/pause module 32, and the play/pause module 32 controls the audio playing module 4 to pause the playing of the audio according to the pause control instruction. The above-described first preset interval and second preset interval are only exemplary. A plurality of volume down preset intervals in which heart rate ranges gradually reduce can be divided above the heart rate range of the third preset interval, and a corresponding preset decibel value is reduced according to the volume down preset interval corresponding to the obtained heart rate data. Hereinafter, the central processor is provided with only two volume down preset intervals (i.e., the first preset interval and the second preset interval) as an example.

Furthermore, the Bluetooth speaker provided by the present invention further comprises a power source module 6, which is also disposed inside the housing 1 and is connected with the power on/off module 33. A fourth preset interval with a heart rate range lower than that of the third preset interval is further provided in the central processor. Wherein, when the heart rate data is within the fourth preset interval, the central processor 5 sends a power off control instruction to the power on/off module 33, and the power on/off module 33 disconnects from the power source module 6 according to the power off control instruction, thereby achieving the purpose of powering off the Bluetooth speaker.

In addition, when the heart rate data is changed from the third preset interval to the second preset interval, that is, the heart rate data is changed from the third preset interval to a volume down preset interval with a lowest heart rate range, the central processor sends a play control instruction to the play/pause module, and the play/pause module controls the audio playing module to play audio according to the play control instruction, and the volume of the audio played by the audio playing module is consistent with volume of the audio played by the audio playing module after reducing by the second preset decibel value.

In addition, when the heart rate data is changed from the second preset interval to the first preset interval, that is, the heart rate data is changed from the volume down preset interval with a lower heart rate range to the volume down preset interval with a higher heart rate range, the central processor sends a volume up control instruction to the volume adjustment module, and the volume adjustment module controls the volume of the audio played by the audio playing module to increase according to the volume up control instruction, and the volume of the audio played by the audio playing module is consistent with volume of the audio played by the audio playing module after reducing by the first preset decibel value.

Specifically, in a specific embodiment of the present invention, when the heart rate data, which is transmitted by the intelligent wearable device, received by the central processor is within 60 times per minute to 70 times per minute, the central processor sends a volume down first control instruction to the volume adjustment module, and the volume adjustment module controls, according to the volume down first control instruction, the volume of audio played by the audio playing module to reduce by 10 decibels; when the heart rate data received by the central processor is within 40 times per minute to 60 times per minute, the central processor sends a volume down second control instruction to the volume adjustment module, and the volume adjustment module controls, according to the volume down second control instruction, the volume of the audio played by the audio playing module to reduce by 10 decibels; when the heart rate data is within 30 times per minute to 40 times per minute, the central processor sends a pause control instruction to the play/pause module, and the play/pause module controls the audio playing module to pause the playing of the audio according to the pause control instruction; when the heart rate data is within 20 times per minute to 30 times per minute, the central processor sends a power off control instruction to the power on/off module, and the power on/off module disconnects from the power source module according to the power off control instruction.

In addition, in combination with the above specific embodiment, in another specific embodiment of the present invention, when the heart rate data is changed from 30~40 times per minute to 40~60 times per minute, the central processor sends a play control instruction to the play/pause module, and the play/pause module controls the audio playing module to play audio according to the play control instruction; when the heart rate data is changed from 40~60 times per minute to 60~70 times per minute, the central processor sends a volume up control instruction to the volume adjustment module, and the volume adjustment module controls the volume of the audio played by the audio playing module to increase according to the volume up control instruction.

In addition, the central processor may also send a volume progressively-decrease control instruction or volume progressively-increase control instruction to the volume adjustment module according to the gradual decrease or increase of the received heart rate data. For example, when the heart rate data currently received by the central processor is reduced by 5 times per minute compared to the heart rate data previously received, the central processor sends a control instruction for reducing the volume by 2 decibels to the volume adjustment module; when the heart rate data currently received by the central processor is increased by 5 times per minute compared to the heart rate data previously received, the central processor sends a control instruction for increasing the volume by 2 decibels to the volume adjustment module; the purpose of intelligent control of audio playing is achieved by the gradual decrease or increase of volume.

Furthermore, the above-described audio control module 3 comprises an audio selection module 34. A fifth preset interval with a heart rate range higher than that of any of the volume down preset interval is further provided in the central processor, wherein, when the heart rate data is within the fifth preset interval, the central processor sends an audio selection instruction to the audio selection module, and the audio selection module selects an audio with a cheerful audio rhythm for the audio playing module to play according to the audio selection instruction; when the heart rate data is equal to or lower than the minimum value of the fifth preset interval, the central processor sends an audio selection instruction to the audio selection module, and the audio selection module selects an audio with a slow rhythm for the audio playing module to play according to the audio selection instruction.

Specifically, when the heart rate data is within 70 times per minute to 100 times per minute, the central processor sends an audio selection instruction to the audio selection module, and the audio selection module selects the audio with a cheerful audio rhythm for the audio playing module to play according to the audio selection instruction; when the heart rate data is lower than 70 times per minute, the central processor sends an audio selection instruction to the audio selection module, and the audio selection module selects the audio with a slow audio rhythm for the audio playing module to play according to the audio selection instruction.

The heart rate data exemplified in the above-described embodiments are merely examples, and specific heart rate data can be set according to individual differences of users, and details will not be described herein again.

In addition, the Bluetooth speaker provided by the present invention further comprises a display screen, the display screen is disposed on the housing 1 and is connected to the central processor, and the display screen is used to display status information of the Bluetooth speaker, for example, display information such as the name, singer, and remaining time of the song currently playing.

In addition, in the Bluetooth speaker provided by the present invention, the housing may be provided with a mechanical control button or touch control button thereon, so that a user can operate manually. Wherein, the mechanical control button and the touch control button may comprise a volume up/down button, a play/pause button, and a power on/off button.

In another aspect, the present invention provides an intelligent control method for playing audio of Bluetooth speaker. The Bluetooth speaker is the above-described Bluetooth speaker, the control method is as follows: the Bluetooth speaker is connected with an intelligent wearable device through the Bluetooth module; the central processor receives heart rate data transmitted by the intelligent wearable device; the central processor sends a preset control instruction to the audio control module according to the received heart rate data, and the audio control module controls, according to the control instruction, the rhythm of the audio played by the audio playing module.

It can be known from the above that the Bluetooth speaker and the intelligent control method for playing audio provided by the present invention can intelligently control the audio played by the Bluetooth speaker, and achieve the purpose of improving the usage experience of a user while helping the user enter the sleep state quickly and effectively and avoiding waste of resources.

As described above, the Bluetooth speaker and the intelligent control method for playing audio according to the present invention are described by way of example with reference to the accompanying drawings. However, those skilled in the art should understand that various improvements can be made to the Bluetooth speaker and the intelligent control method for playing audio without departing from the content of the present invention. Therefore, the protection scope of the present invention should be determined by the content of the appended claims.

We claims:

1. A Bluetooth speaker, comprising a housing, a Bluetooth module, an audio control module and an audio playing module provided inside the housing,
    wherein, the audio control module is connected with the audio playing module;
    wherein, the Bluetooth speaker further comprises a central processor, the central processor is provided inside the housing, and both of the Bluetooth module and the audio control module are connected to the central processor; and
    wherein, the Bluetooth speaker is connected with an intelligent wearable device through the Bluetooth module, so that the Bluetooth speaker carries out Bluetooth communication with the intelligent wearable device; the central processor acquires, through the Bluetooth module, heart rate data transmitted by the intelligent wearable device, and sends a preset control instruction to the audio control module according to the heart rate data; and the audio control module controls, according to the control instruction, the rhythm and the volume, as well as pausing and powering off of the audio played by the audio playing module,
    wherein, the audio control module comprises a volume adjustment module; and
    wherein, the central processor is provided with a plurality of volume down preset intervals therein, in which heart rate ranges are sequentially reduced, and when the heart rate data is within a corresponding volume down preset interval, the central processor sends a volume down control instruction to the volume adjustment module, and the volume adjustment module controls, according to the volume down control instruction, the volume of the audio played by the audio playing module to reduce by a corresponding preset decibel value.

2. The Bluetooth speaker according to claim 1, wherein, the audio control module comprises a play/pause module, and a third preset interval with a heart rate range lower than that of any of the volume down preset intervals is further provided in the central processor, when the heart rate data is within the third preset interval, the central processor sends a pause control instruction to the play/pause module, and the play/pause module controls the audio playing module to pause the playing of the audio according to the pause control instruction.

3. The Bluetooth speaker according to claim 2, further comprises a power source module, and the audio control module comprises a power on/off module, the power source module is provided inside the housing and is connected with the power on/off module;
    wherein, a fourth preset interval with a heart rate range lower than that of the third preset interval is further provided in the central processor,
        when the heart rate data is within the fourth preset interval, the central processor sends a power off control instruction to the power on/off module, and the power on/off module disconnects from the power source module according to the power off control instruction.

4. The Bluetooth speaker according to claim 2, wherein, when the heart rate data is changed from the third preset interval to a volume down preset interval with a lowest heart rate range, the central processor sends a play control instruction to the play/pause module, and the play/pause module controls the audio playing module to play audio according to the play control instruction, and a volume of the audio played by the audio playing module is consistent with a volume of the audio played by the audio playing module after reducing by a corresponding preset decibel value in the volume down preset interval with the lowest heart rate range.

5. The Bluetooth speaker according to claim 1, wherein, when the heart rate data is changed from a volume down preset interval with a lower heart rate range to a volume down preset interval with a higher heart rate range, the central processor sends a volume up control instruction to the volume adjustment module, the volume adjustment module controls the volume of the audio played by the audio playing module to increase according to the volume up control instruction, and volume of the audio played by the audio playing module is consistent with volume of the audio played by the audio playing module after reducing by a corresponding preset decibel value in the volume down preset interval with the higher heart rate range.

6. The Bluetooth speaker according to claim 1, wherein, the audio control module comprises an audio selection module, and a fifth preset interval with a heart rate range higher than that of any of the volume down preset intervals is further provided in the central processor, wherein,
when the heart rate data is within the fifth preset interval, the central processor sends an audio selection instruction to the audio selection module, and the audio selection module selects an audio with a cheerful audio rhythm for the audio playing module to play according to the audio selection instruction;
when the heart rate data is equal to or lower than a minimum value of the fifth preset interval, the central processor sends an audio selection instruction to the audio selection module, and the audio selection module selects an audio with a slow rhythm for the audio playing module to play according to the audio selection instruction.

7. The Bluetooth speaker according to claim 1, further comprises:
a display screen, the display screen is disposed on the housing and is connected to the central processor, and the display screen is used to display a status information of the Bluetooth speaker.

8. The Bluetooth speaker according to claim 1, wherein, the housing is provided with a mechanical control button and/or a touch control button thereon, and the mechanical control button and/or the touch control button comprises a volume up/down button, a play/pause button, and a power on/off button.

9. An intelligent control method for playing audio in the Bluetooth speaker according to claim 1, the intelligent control method for playing audio comprises the following steps:
the Bluetooth speaker is connected with the intelligent wearable device through the Bluetooth module;
the central processor receives the heart rate data transmitted by the intelligent wearable device; and
the central processor sends the preset control instruction to the audio control module according to the received heart rate data, and the audio control module controls, according to the control instruction, the rhythm and the volume, as well as pausing and powering off of the audio played by the audio playing module.

* * * * *